US009927989B2

(12) United States Patent
Erdmann et al.

(10) Patent No.: US 9,927,989 B2
(45) Date of Patent: Mar. 27, 2018

(54) PDSE EXTENDED GENERATION GROUPING FOR TIERED STORAGE SYSTEMS

(71) Applicant: International Business Machines Corporation, Armonk, NY (US)

(72) Inventors: Derek L. Erdmann, Tucson, AZ (US);
David C. Reed, Tucson, AZ (US);
Thomas C. Reed, Tucson, AZ (US);
Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 14/929,360

(22) Filed: Nov. 1, 2015

(65) Prior Publication Data
US 2017/0123692 A1 May 4, 2017

(51) Int. Cl.
*G06F 3/00* (2006.01)
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
None
See application file for complete search history.

(56) References Cited

U.S. PATENT DOCUMENTS 6,651,075 B1 * 11/2003 Kusters ............... G06F 11/1448
8,589,652 B2 11/2013 Belisle et al.
8,775,379 B2 7/2014 Reed et al.
8,880,837 B2 11/2014 Dudgeon et al.
8,918,400 B2 12/2014 Belisle et al.
9,092,469 B2 7/2015 Yamamoto
2012/0017042 A1 * 1/2012 Matsui ................. G06F 3/0608
711/114
2014/0164337 A1 6/2014 Reed et al.
2014/0201158 A1 * 7/2014 Montgomery .......... G06F 17/30
707/679

(Continued)

OTHER PUBLICATIONS

Gutschke, Dirk, "PDSE and z/OS DFSMS V2.1", IBM Corporation, IBM Technical Support Services, Sep. 2014, pp. 1-26.

(Continued)

*Primary Examiner* — David X Yi
*Assistant Examiner* — Craig Goldschmidt
(74) *Attorney, Agent, or Firm* — Nelson & Nelson; Daniel P. Nelson; Alexis V. Nelson

(57) ABSTRACT

A method for storing data includes establishing an extended generation group comprising a plurality of data sets. The plurality of data sets include a first data set containing primary members and a first number of generations of each of the primary members, and a second data set containing a second number of generations of each of the primary members. The first data set and the second data set are stored on different tiers of a tiered storage system, and may even be stored on different volumes. The first data set may be stored on higher performance storage media and the second data set may be stored on lower performance storage media. Additionally, the second number will typically be greater than the first number so that more generations are stored on lower performance storage media. A corresponding system and computer program product are also disclosed.

20 Claims, 6 Drawing Sheets

(56) References Cited

U.S. PATENT DOCUMENTS

| | | |
|---|---|---|
| 2014/0229482 A1 | 8/2014 | Milenova et al. |
| 2015/0039575 A1 | 2/2015 | Helak et al. |
| 2015/0081997 A1 | 3/2015 | Aranguren et al. |
| 2015/0193345 A1 | 7/2015 | Helak et al. |
| 2015/0248443 A1* | 9/2015 | Golander .......... G06F 17/30312 707/770 |

OTHER PUBLICATIONS

Winnard, Keith, et al., "DFSMShsm: Managing PDSE V2 Data Sets," IBM Corporation, Redpaper, Apr. 2015.

* cited by examiner

PDSE EXTENDED GENERATION GROUPING FOR TIERED STORAGE SYSTEMS

BACKGROUND

Field of the Invention

This invention relates to systems and methods for storing data in tiered storage systems.

Background of the Invention

In the z/OS operating system, PDSE (partitioned data set extended) data sets are used to simply and efficiently organize related groups of sequential files, also referred to as "members." Current versions of PDSE data sets may support multiple levels, or generations, of members. Using this feature, when a member is changed, a new member may be created and the older version of the member may be retained, up to a specified number of generations. This feature advantageously enables members to be recovered in cases of accidental deletion, user errors, data corruption, or the like. This feature also allows multiple generations of a member to be retained for archival reasons. The retained generations may be structured in a first in, first out (FIFO) configuration, such that an oldest generation is discarded when the retained generation limit is reached.

Unfortunately each generation in a PDSE data set is retained in its entirety, resulting in the multiplication of space requirements for the PDSE dataset. Additionally, member generations are typically only utilized in the event they need to be recovered, meaning that most of the space allocated to a PDSE data set will never be accessed. Such inefficient use of space may be particularly costly when storing performance-critical PDSE datasets on expensive storage media such as solid state drives (SSDs). For example, a PDSE data set containing a critical load library may be stored on SSD for performance reasons. Such a PDSE data set may be configured to retain one hundred generations of each member. This requires allocating approximately one hundred times the space required to store the primary members. The vast majority of this allocated space will contain member generations that are never accessed but nevertheless consume valuable SSD space.

In view of the foregoing, what are needed are systems and methods to more efficiently use space when using PDSE data sets. Ideally, such systems and method will enable PDSE member generations to be stored on multiple storage tiers to reduce use of expensive storage media.

SUMMARY

The invention has been developed in response to the present state of the art and, in particular, in response to the problems and needs in the art that have not yet been fully solved by currently available systems and methods. Accordingly, the invention has been developed to provide systems and methods to more efficiently store data. The features and advantages of the invention will become more fully apparent from the following description and appended claims, or may be learned by practice of the invention as set forth hereinafter.

Consistent with the foregoing, a method for storing data is disclosed herein. In one embodiment, such a method includes establishing an extended generation group comprising a plurality of data sets. The plurality of data sets include a first data set containing primary members and a first number of generations of each of the primary members, and a second data set containing a second number of generations of each of the primary members. The first data set and the second data set are stored on different tiers of a tiered storage system, and may even be stored on different volumes. Typically the first data set will be stored on higher performance storage media and the second data set will be stored on lower performance storage media. Additionally, the second number will typically be greater than the first number so that more generations are stored on lower performance storage media.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
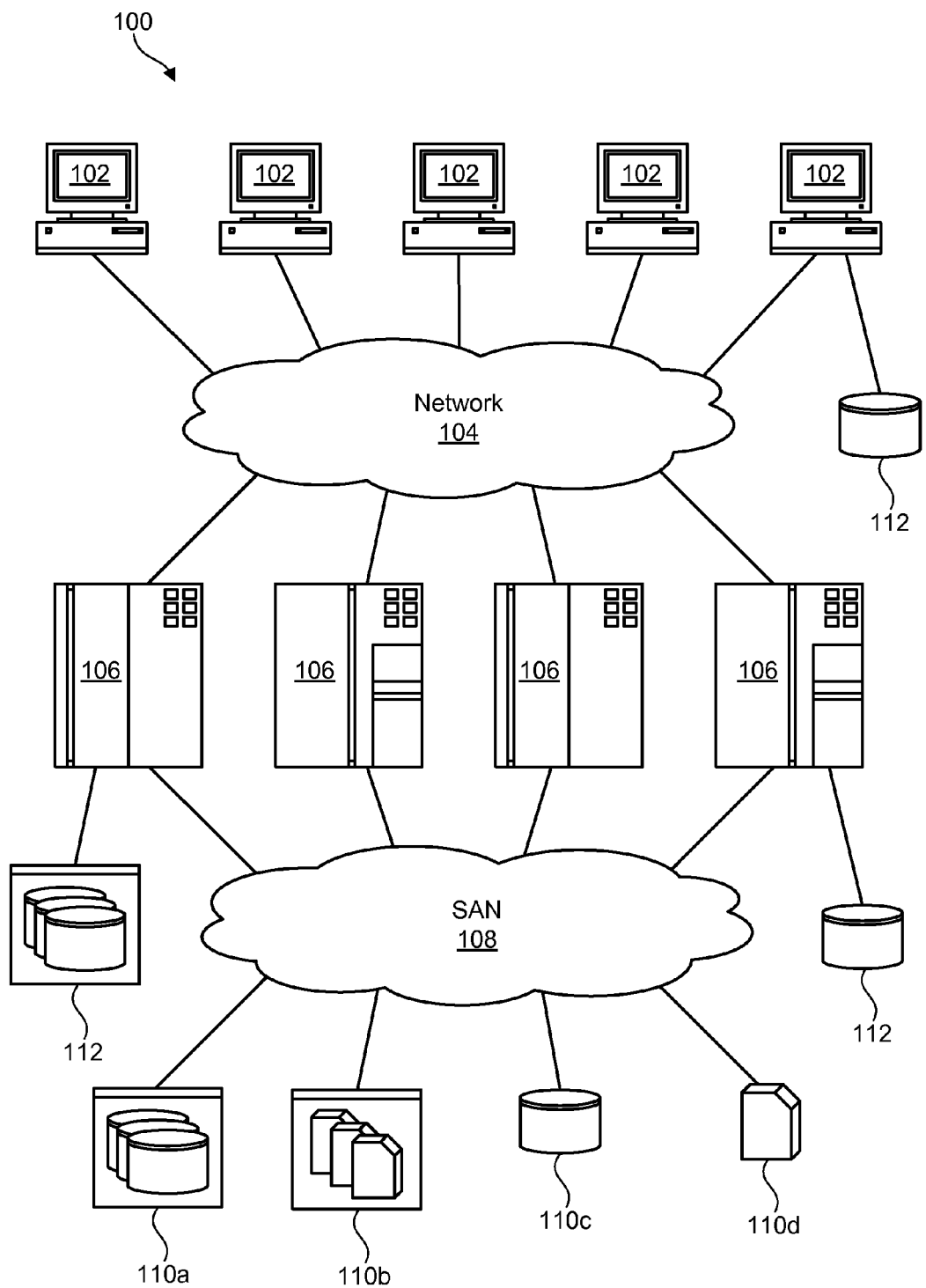
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer-readable program instructions thereon for causing a processor to carry out aspects of the present invention.

The computer-readable storage medium may be a tangible device that can retain and store instructions for use by an instruction execution device. The computer-readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer-readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network architecture 100 is illustrated. The network architecture 100 is presented to show one example of an environment where various embodiments of the invention may operate. The network architecture 100 is presented only by way of example and not limitation. Indeed, the systems and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

In certain embodiments, storage 110 in the network architecture 100 may be organized into one or more storage tiers based on the performance of the underlying storage media. For example, a highest storage tier may contain higher performance storage media such as a solid state drives, a middle storage tier may contain medium-performance storage media such as hard disk drives, and a lower storage tier may contain lower performance storage media such as tape or lower performance hard disk drives. Data may be moved between the storage tiers in accordance with the data's importance or "hotness".

Figure 2:
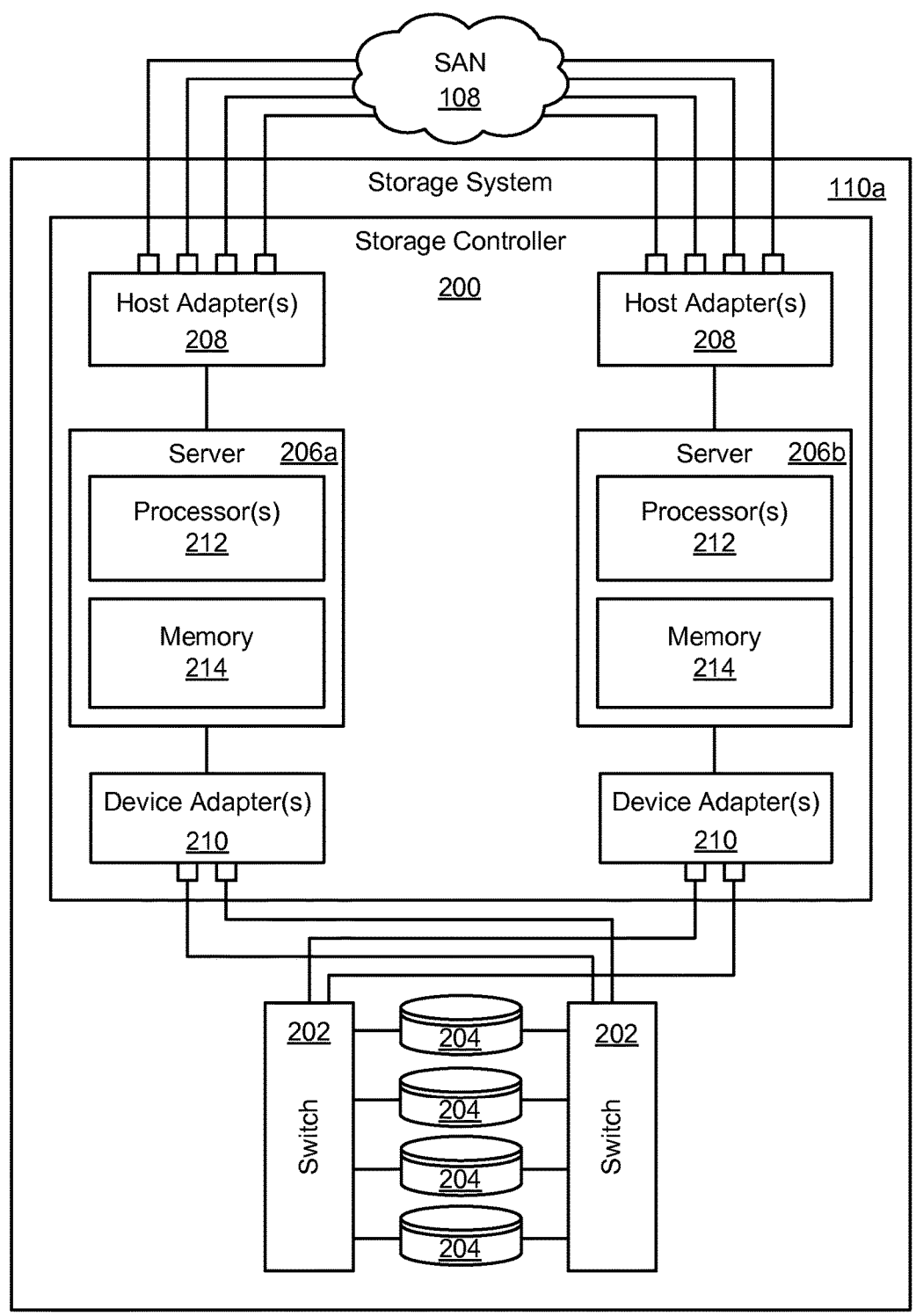
FIG. 2 is a high-level block diagram showing one example of a storage system in which a system and method in accordance with the invention may be implemented.

Referring to FIG. 2, one embodiment of a storage system 110a containing an array of storage drives 204 (e.g., hard-disk drives 204 and/or solid-state drives 204) is illustrated. The internal components of the storage system 110a are shown since embodiments of the invention may, in certain embodiments, be implemented within such a storage system 110a, although embodiments of the invention may also be applicable to other storage systems or groups of storage systems. As shown, the storage system 110a includes a storage controller 200, one or more switches 202, and one or more storage drives 204 such as hard disk drives 204 and/or solid-state drives 204 (such as flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the apparatus and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
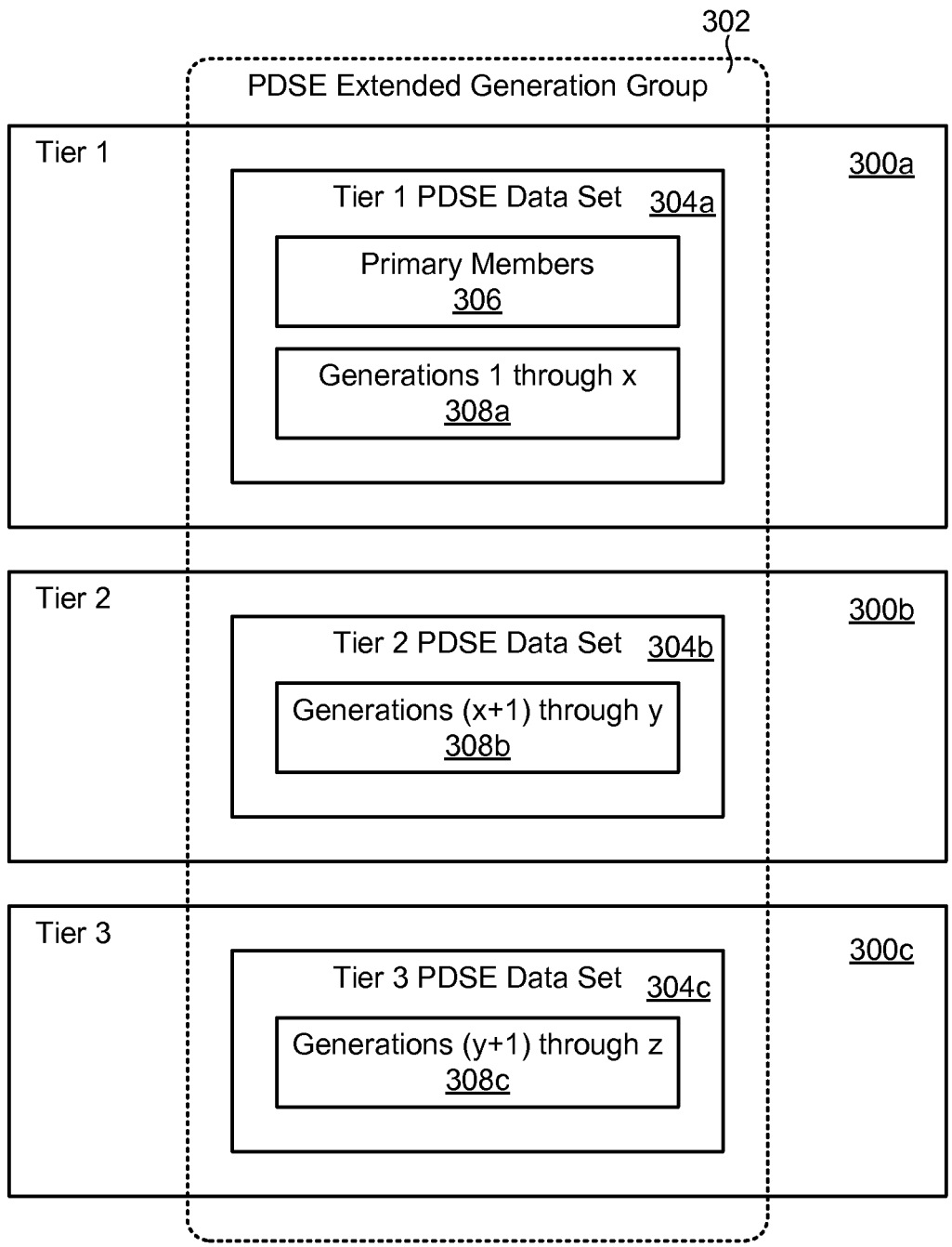
FIG. 3 is a high-level block diagram showing a PDSE extended generation group distributed across multiple storage tiers.

Referring to FIG. 3, in certain embodiments, a storage system 110a such as that illustrated in FIG. 2 may be configured to contain different storage tiers 300. Each of the storage tiers 300 may contain different types of storage media having different performance and/or cost. Higher cost storage media is generally faster while lower cost storage media is generally slower. Because of its reduced cost, the tiered storage architecture may include substantially more storage capacity for lower cost storage media than higher cost storage media. Storage management software and/or firmware running on a host device 106 or the storage system 110a may automatically move data between higher cost and lower cost storage media to optimize performance. For example, hotter data (i.e., data that is accessed more frequently) may be promoted to faster storage media while colder data (i.e., data that is accessed less frequently) may be demoted to slower storage media. As the hotness and coldness of data changes, the data may be migrated between the storage tiers.

The storage media used to implement the storage tiers 300 may vary. In one example, a first storage tier 300a includes higher performance storage media such as solid state drives 204, a second storage tier 300b includes medium-performance storage media such as "enterprise" hard disk drives 204, and a third storage tier 300c includes lower performance storage media such as "nearline" hard-disk drives 204. Due to the cost of the storage media, the second storage tier 300b may have more storage capacity than the first storage tier 300a, and the third storage tier 300c may have more storage capacity than the second storage tier 300b, although this is not necessary.

As previously mentioned, in the z/OS operating system, PDSE (partitioned data set extended) data sets are used to simply and efficiently organize related groups of sequential files, also referred as "members." In certain embodiments, a storage system 110a such as that illustrated in FIG. 2 may store PDSE data sets. PDSE data sets may support multiple levels, or generations, of primary members. When a primary member is changed, a new member may be created and the older version of the member may be retained, up to a specified number of generations. This feature enables members to be recovered in cases of accidental deletion, user errors, data corruption, or the like. This feature also allows multiple generations of a member to be retained for archival reasons. The retained generations may be structured in a first in, first out (FIFO) configuration, such that an oldest generation is discarded when a retained generation limit is reached.

Unfortunately, storing multiple generations in a PDSE data set may cause the data set to consume significantly more space then it would otherwise. Depending on the number of generations retained, the generations may make up a large percentage (possibly over ninety percent) of the overall space consumed by the PDSE data set. As previously explained, these generations most likely will never be accessed or utilized in any way, but may nevertheless occupy space on the storage media hosting the PDSE data set. This may be costly when storing performance-critical PDSE datasets on expensive storage media such as solid state drives (SSDs). In such cases, the primary members of the PDSE data set may require improved I/O performance that warrant placement on the expensive storage media, while the retained generations of the primary members may not.

In order to address the problems identified above, a new type of data structure may be provided that provides various advantages of a conventional PDSE data set while eliminating or mitigating various of its disadvantages. This new type of data structure will be referred to herein as a "PDSE extended generation group" or simply "extended generation group." Instead of using a single conventional PDSE data set to store data, a PDSE extended generation group 302 includes multiple data sets 304a-c, such as multiple PDSE data sets 304a-c. A first data set 304a (hereinafter referred to as a "Tier 1 PDSE data set 304a") of the PDSE extended generation group 302 may contain primary members 306 and a first number of generations 308 of the primary members 306. A second data set 304b (hereinafter referred to as a "Tier 2 PDSE data set 304b") of the PDSE extended generation group 302 may contain no primary members 306 and a second number of generations 308 of the primary members 306. A third data set 304c (hereinafter referred to as a "Tier 3 PDSE data set 304c") of the PDSE extended generation group 302 may contain no primary members 306 and a third number of generations 308 of the primary members 306. The PDSE extended generation group 302 may include additional (or fewer) PDSE data sets 304 as needed.

The generations 308 of the PDSE data sets 304 may be sequential, meaning that, if the PDSE extended generation group 302 contains z generations 308 total, the Tier 1 PDSE data set 304a will contain generations 1 through x, the Tier 2 PDSE data set 304b will contain generations (x+1) through y, and the Tier 3 PDSE data set 304c will contain generations (y+1) through z, where x and y establish divisions within the z generations 308.

The youngest generations 308a (which are incidentally those most likely to be accessed) may be stored in the Tier 1 PDSE data set 304a on the highest performance storage media. The next youngest generations 308 may be stored on the Tier 2 PDSE data set 304b and the oldest generations 308 may be stored on the Tier 3 PDSE data set 304c. Additional tiers 300 and associated data sets 304 are possible and within the scope of the invention.

The manner in which generations 308 are distributed across PDSE data sets 304 of the PDSE extended generation group 302 may vary in different embodiments. In one embodiment, the number of generations 308b in the Tier 2 PDSE data set 304b is twice the number of generations 308a in the Tier 1 PDSE data set 304a, and the number of generations 308c in the Tier 3 PDSE data set 304c is twice the number of generations 308b in the Tier 2 PDSE data set 304b. This will allow the majority of generations 308 to be stored on lower performance and less expensive storage media, while allowing a relatively smaller number of generations 308 to be stored on higher performance and more expensive storage media.

By embodying the PDSE extended generation group 302 as multiple PDSE data sets 304 as opposed to a single PDSE data set, the PDSE data sets 304 may be distributed across multiple tiers 300 of a tiered storage architecture. In certain embodiments, the PDSE data sets 304 may be migrated independently between storage tiers 300 as well as be stored on different volumes of the tiered storage system (thereby providing an additional benefit over a conventional PDSE data set, which must reside on a single volume). In certain embodiments, the only restriction that may be imposed on the PDSE extended generation group 302 is that all PDSE data sets 304 associated therewith must reside on online or offline storage at the same time.

Figure 4:
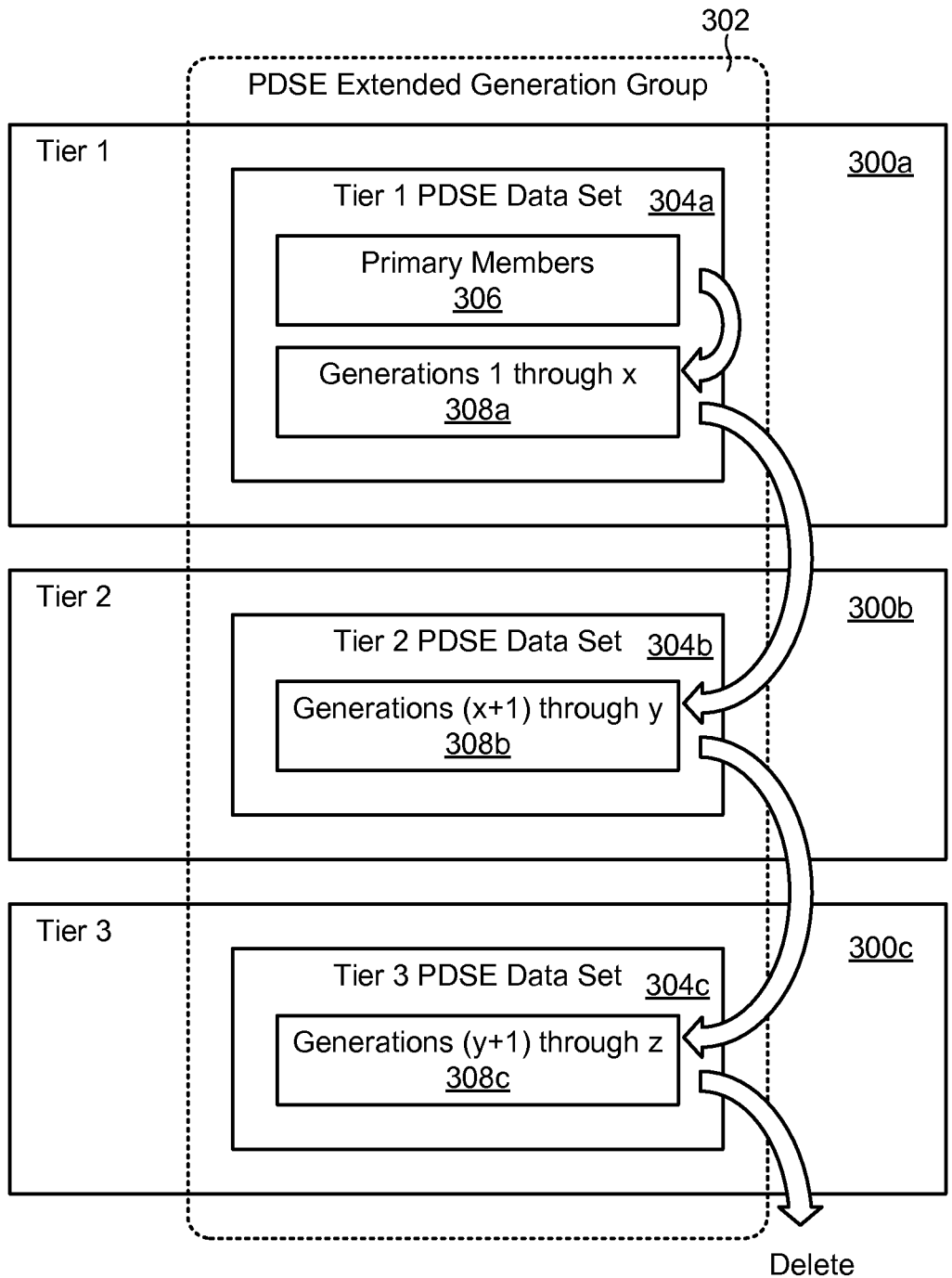
FIG. 4 is a high-level block diagram showing generation propagation between data sets in a PDSE extended generation group.

Referring to FIG. 4, in operation, when a primary member 306 is modified, the previous version of the primary member 306 becomes the first generation 308, the previous first generation 308 becomes the second generation 308, and so forth. This may cause the last generation 308 in the Tier 1 PDSE data set 304a to be moved to the Tier 2 PDSE data set 304b, and the last generation 308 in the Tier 2 PDSE data set 304b to be moved to the Tier 3 PDSE data set 304c, as shown in FIG. 4. When a generation 308 is added to the Tier 3 PDSE data set 304c, the last generation 308 may be permanently deleted from the data set 304c (assuming the maximum number of generations 308 is stored in the PDSE extended generation group 302). In this way, generations 308 may propagate through the data sets 304a-c until they are deleted. In certain embodiments, the generations 308 may propagate through the data sets 304 asynchronously in the background, meaning that a write to the PDSE extended generation group 302 may be considered complete before the generations 308 are successfully moved from one PDSE data set 304 to another.

Figure 5:
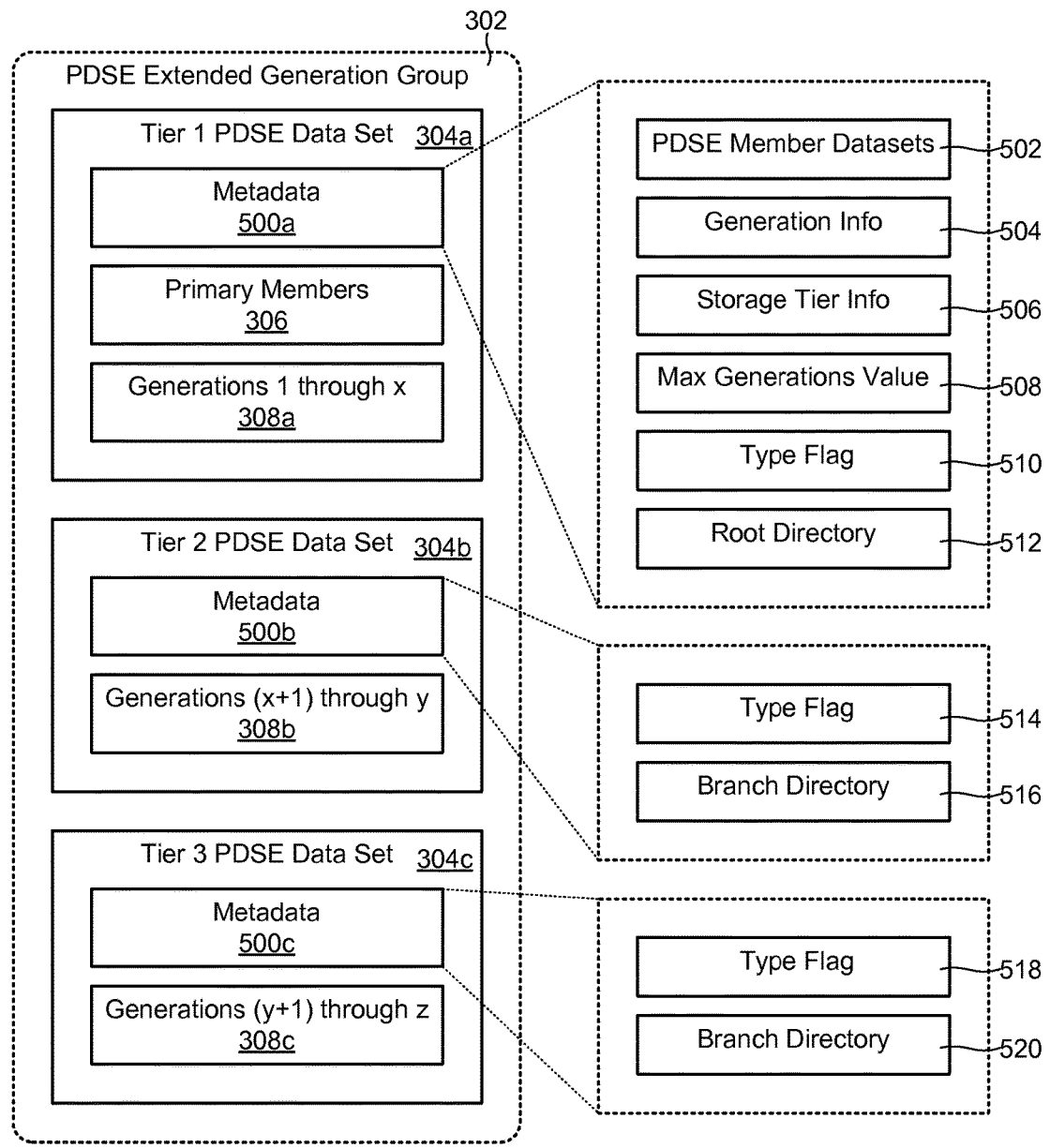
FIG. 5 is a high-level block diagram showing various types of metadata that may be stored in a PDSE extended generation group.

Referring to FIG. 5, to enable the functionality of the PDSE extended generation group 302, the PDSE data sets 304 associated with the PDSE extended generation group 302 may contain various types of metadata 500. For example, a mechanism may be provided to differentiate between PDSE data sets 304a that contain primary member 306 and those that contain only generations 308. In one embodiment, a type flag 510, 514, 518 may be provided in each PDSE data set 304 that indicates whether the PDSE data set 304 contains primary members 306 or generations 308 only. This may assist a PDSE access method in locating primary members 306/generations 308 within the PDSE extended generation group 302.

In certain embodiments, all data accessed in a PDSE extended generation group 302 may originate at the Tier 1 PDSE data set 304a. Specifically, the Tier 1 PDSE data set 304a may, in certain embodiments, contain a root directory 512 that acts as a starting point to locate generations 308 in other PDSE data sets 304a, 304b associated with the PDSE extended generation group 302. The other PDSE data sets (i.e., the Tier 2 PDSE data set 304b and Tier 3 PDSE data set 304c) may in certain embodiments contain branch directories 516, 520 that enable specific generations 308 to be located and retrieved within the respective data sets 304b, 304c.

Other types of metadata 500 may also be provided. For example, the Tier 1 PDSE data set 304a may contain information 502 describing which PDSE member data sets 304 are associated with a PDSE extended generation group 302, information 504 about the number of generations 308 in each PDSE data set 304, and information 506 indicating which storage tier 506 each PDSE data set 304 resides on. In certain embodiments, the metadata 500 may also include a maximum generations value 508 that indicates a maximum number of generations 308 in the Tier 1 PDSE data set 304a. In certain embodiments, the other PDSE data sets 304b, 304c may contain a number of generations 308 that is a multiple of this number 508. For example, the Tier 2 PDSE data set 304b may contain a number of generations 308 equal to twice the maximum generations value 508 and the Tier 3 PDSE data set 304c may contain a number of generations 308 equal to four times the maximum generations value 508. Thus, in certain embodiments, the maximum generations value 508 may be used to derive the number of generations 308 in each PDSE data set 304.

Figure 6:
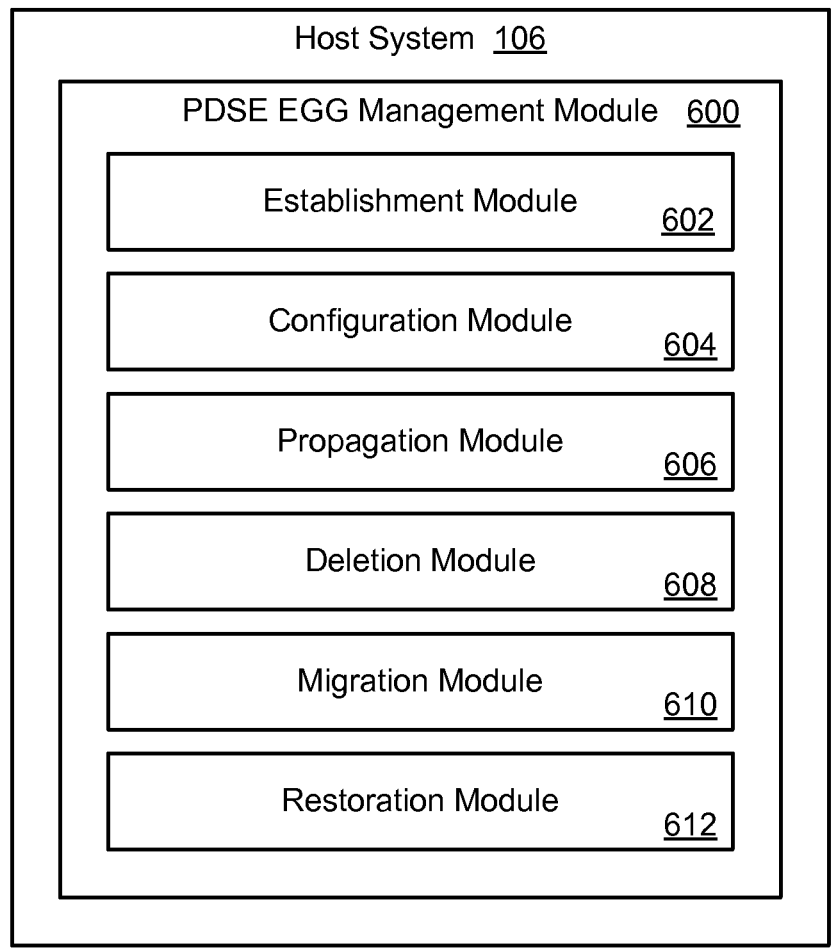
FIG. 6 is a high-level block diagram showing various modules that may be used to manage a PDSE extended generation group.

Referring to FIG. 6, in order to manage a PDSE extended generation group (EGG) 302, a PDSE EGG management module 600 may be provided in a host system 106 (or other suitable system). The PDSE EGG management module 600 may include various sub-modules to provide various features and functions. These sub-modules may be embodied in software, firmware, hardware, or a combination thereof. In certain embodiments, the sub-modules may include one or more of an establishment module 602, configuration module 604, propagation module 606, deletion module 608, migration module 610, and restoration module 612.

The establishment module 602 may be used establish a PDSE extended generation group 302 and associated PDSE data sets 304. The configuration module 604 may be used to configure (manually by a user, or automatically) the PDSE extended generation group 302. For example, the configuration module 604 may be used to establish which PDSE data sets 304 are associated with the PDSE extended generation group 302, how many generations 308 each PDSE data set 304 will contain, which storage tier 300 each PDSE data set will reside on, the type flag for each PDSE data set 304, and the like. In certain embodiments, the configuration module 604 may be used to set a maximum generations value 508 used to establish a number of generations 308 for each PDSE data set 304 associated with a PDSE extended generation group 302.

The propagation module 606 may be used to propagate generations 308 between PDSE data sets 304 associated with a PDSE extended generation group 302. For example, when a primary member 306 is updated, the propagation module 606 may propagate the last generation 308 from the Tier 1 PDSE data set 304*a* to the Tier 2 PDSE data set 304*b*, and the last generation 308 from the Tier 2 PDSE data set 304*b* to the Tier 3 PDSE data set 304*c*. In such a scenario, assuming the PDSE extended generation group 302 contains the maximum number of generations 308, the deletion module 608 may delete the last generation 308 from the Tier 3 PDSE data set 304*c*.

The migration module 610 may be configured to migrate PDSE data sets 304 associated with a PDSE extended generation group 302. As previously mentioned, in certain embodiments, the PDSE data sets 304 associated with a PDSE extended generation group 302 may be migrated between or within storage tiers 300 independently. As previously mentioned, in certain embodiments, all PDSE data sets 304 associated with a PDSE extended generation group 302 may need to reside on either online or offline storage at the same time. In certain embodiments, the migration module 610 may be used to migrate PDSE data sets 304 associated with a PDSE extended generation group 302 between online and offline storage.

The restoration module 612 may be configured to restore a primary member 306 to a selected generation 308. To accomplish this, the restoration module 612 may search the PDSE extended generation group 302 for a specific generation 308 (using, for example, the root directory 512 and branch directories 516, 520 previously discussed) and restore the specific generation 308 to the corresponding primary member 306. In certain embodiments, restoring a primary member 306 to a previous generation 308 may invoke the propagation module 606 to propagate generations 308 between PDSE data sets 304 in the PDSE extended generation group 302.

Although particular reference has been made herein to PDSE data sets 108, the systems and methods disclosed herein may be equally applicable to other types of data sets with similar characteristics. For example, any type of data set 108 that stores multiple data elements (e.g., members, files, etc.) as well as a number of previous generations of the data elements may beneficially utilize the systems and methods disclosed herein to more efficiently utilize storage space. Thus, the systems and methods disclosed herein are not limited to PDSE data sets 108.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for storing data, the method comprising:
   establishing an extended generation group comprising a plurality of data sets, the plurality of data sets comprising a first data set containing primary members and a first number of generations of each of the primary members, and a second data set containing a second number of generations of each of the primary members, wherein the first data set and the second data set are stored on different tiers of a tiered storage system;
   indicating, in metadata of the first data set, that the first data set and the second data set are associated with the extended generation group;
   indicating, in the metadata of the first data set, a maximum number of generations allowable in each of the first data set and the second data set; and
   providing, in the metadata of the first data set, a root directory that provides a starting point to locate generations in each of the first data set and the second data set.

2. The method of claim 1, wherein, for each primary member, the generations in the second data set are older than the generations in the first data set.

3. The method of claim 1, wherein the second number is greater than the first number.

4. The method of claim 3, wherein the second number is a multiple of the first number.

5. The method of claim 1, further comprising providing, in each of the first data set and the second data set, a type flag that indicates whether the associated data set includes primary members or generations only.

6. The method of claim 1, further comprising storing the first and second data sets on different volumes.

7. The method of claim 1, further comprising providing, in metadata of the second data set, a branch directory that enables generations to be located and retrieved from within the second data set.

8. A computer program product for storing data, the computer program product comprising a computer-readable medium having computer-usable program code embodied therein, the computer-usable program code comprising:
   computer-usable program code to establish an extended generation group comprising a plurality of data sets, the plurality of data sets comprising a first data set containing primary members and a first number of generations of each of the primary members, and a second data set containing a second number of generations of each of the primary members, wherein the first data set and the second data set are stored on different tiers of a tiered storage system;

computer-usable program code to indicate, in metadata of the first data set, that the first data set and the second data set are associated with the extended generation group;

computer-usable program code to indicate, in the metadata of the first data set, a maximum number of generations allowable in each of the first data set and the second data set; and computer-usable program code to provide, in the metadata of the first data set, a root directory that provides a starting point to locate generations in each of the first data set and the second data set.

9. The computer program product of claim 8, wherein, for each primary member, the generations in the second data set are older than the generations in the first data set.

10. The computer program product of claim 8, wherein the second number is greater than the first number.

11. The computer program product of claim 10, wherein the second number is a multiple of the first number.

12. The computer program product of claim 8, further comprising computer-usable program code to provide, in each of the first data set and the second data set, a type flag that indicates whether the associated data set includes primary members or generations only.

13. The computer program product of claim 8, further comprising computer-usable program code to store the first and second data sets on different volumes.

14. The computer program product of claim 8, further comprising computer-usable program code to provide, in metadata of the second data set, a branch directory that enables generations to be located and retrieved from within the second data set.

15. A system for storing data, the system comprising:
at least one processor;
at least one memory device operably coupled to the at least one processor and storing instructions for execution on the at least one processor, the instructions causing the at least one processor to:
establish an extended generation group comprising a plurality of data sets, the plurality of data sets comprising a first data set containing primary members and a first number of generations of each of the primary members, and a second data set containing a second number of generations of each of the primary members, wherein the first data set and the second data set are stored on different tiers of a tiered storage system;
indicate, in metadata of the first data set, that the first data set and the second data set are associated with the extended generation group;
indicate, in the metadata of the first data set, a maximum number of generations allowable in each of the first data set and the second data set; and
provide, in the metadata of the first data set, a root directory that provides a starting point to locate generations in each of the first data set and the second data set.

16. The system of claim 15, wherein, for each primary member, the generations in the second data set are older than the generations in the first data set.

17. The system of claim 15, wherein the second number is a multiple of the first number.

18. The system of claim 15, wherein the instructions further cause the at least one processor to provide, in each of the first data set and the second data set, a type flag that indicates whether the associated data set includes primary members or generations only.

19. The system of claim 15, wherein the instructions further cause the at least one processor to store the first and second data sets on different volumes.

20. The system of claim 15, wherein the instructions further cause the at least one processor to provide, in metadata of the second data set, a branch directory that enables generations to be located and retrieved from within the second data set.

* * * * *